United States Patent
Kim

(10) Patent No.: US 10,023,051 B2
(45) Date of Patent: Jul. 17, 2018

(54) VEHICLE AND METHOD OF CONTROLLING THE SAME

(71) Applicant: HYUNDAI MOTOR COMPANY, Seoul (KR)

(72) Inventor: Sung Un Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 89 days.

(21) Appl. No.: 14/874,205

(22) Filed: Oct. 2, 2015

(65) Prior Publication Data

US 2016/0159345 A1    Jun. 9, 2016

(30) Foreign Application Priority Data

Dec. 8, 2014    (KR) .................. 10-2014-0174970

(51) Int. Cl.
*G06F 7/00*    (2006.01)
*B60K 35/00*    (2006.01)

(52) U.S. Cl.
CPC ........ *B60K 35/00* (2013.01); *B60K 2350/962* (2013.01); *B60K 2350/967* (2013.01)

(58) Field of Classification Search
CPC ........ B60K 2350/962; B60K 2350/967; B60K 35/00
See application file for complete search history.

(56) References Cited

U.S. PATENT DOCUMENTS

| 9,043,133 | B2* | 5/2015 | Rosario | G01C 21/3602 |
| | | | | 701/302 |
| 2004/0122562 | A1* | 6/2004 | Geisler | B60R 16/0231 |
| | | | | 701/1 |
| 2004/0209594 | A1* | 10/2004 | Naboulsi | B60R 11/0264 |
| | | | | 455/404.1 |

(Continued)

FOREIGN PATENT DOCUMENTS

| JP | 2004-149120 A | 5/2004 |
| JP | 2007-140978 A | 6/2007 |

(Continued)

OTHER PUBLICATIONS

Notice of Patent Allowance Korean Patent Application No. 10-2014-0174970 dated May 4, 2016 with partial English translation.

*Primary Examiner* — Khoi H Tran
*Assistant Examiner* — Jorge O Peche
(74) *Attorney, Agent, or Firm* — McDermott Will & Emery LLP

(57) ABSTRACT

Disclosed herein are a vehicle and a method of controlling the same. The vehicle may be safely controlled by considering a manipulation load amount for manipulating a function of the vehicle when a user manipulates a user interface of the function, thereby providing safer driving of the vehicle. The vehicle includes a storage configured to store information on sizes of manipulation loads for a plurality of user interfaces for using a plurality of functions of the vehicle, and a controller configured to perform safe driving (Continued)

control corresponding to a size of a manipulation load of the a corresponding function from the plurality of functions when the a user interface from the plurality of user interfaces is manipulated to use at least one of the plurality of functions of the vehicle.

18 Claims, 14 Drawing Sheets

(56) References Cited

U.S. PATENT DOCUMENTS

| | | | |
|---|---|---|---|
| 2007/0241882 A1* | 10/2007 | Panttaja | G08G 1/20 340/521 |
| 2013/0219318 A1* | 8/2013 | Schreiber | B60K 35/00 715/771 |
| 2014/0037162 A1* | 2/2014 | Papier | G06F 19/324 382/128 |
| 2014/0309870 A1* | 10/2014 | Ricci | H04W 48/04 701/36 |
| 2015/0193095 A1* | 7/2015 | Jiang | G06F 3/0484 715/810 |
| 2015/0232065 A1* | 8/2015 | Ricci | B60R 25/01 701/36 |
| 2015/0256663 A1* | 9/2015 | Takikawa | H04M 1/7253 455/418 |
| 2015/0370830 A1* | 12/2015 | Murphy-Chutorian | G06F 17/30256 707/748 |
| 2016/0082840 A1* | 3/2016 | Yoshida | B60K 35/00 701/36 |
| 2016/0150070 A1* | 5/2016 | Goren | H04W 48/04 455/404.2 |
| 2016/0159218 A1* | 6/2016 | Kang | B60K 35/00 701/36 |
| 2017/0001650 A1* | 1/2017 | Park | B60W 50/08 |

FOREIGN PATENT DOCUMENTS

| | | | |
|---|---|---|---|
| JP | 2009-090690 A | | 4/2009 |
| JP | 2012-216203 A | | 11/2012 |
| JP | 2012216203 A | * | 11/2012 |
| JP | 2012216203 A | * | 11/2012 |
| JP | 2014-002763 A | | 1/2014 |
| KR | 10-2013-0066181 A | | 6/2013 |
| KR | 10-2013-0115737 A | | 10/2013 |

* cited by examiner

VEHICLE AND METHOD OF CONTROLLING THE SAME

CROSS-REFERENCE TO RELATED APPLICATION

This application claims the benefit of priority to the Korean Patent Application No. 10-2014-0174970, filed on Dec. 8, 2014 in the Korean Intellectual Property Office, the disclosure of which is incorporated herein in its entirety by reference.

TECHNOLOGY FIELD

Embodiments of the present disclosure relate to a vehicle, and more particularly, to a vehicle capable of allowing several functions performed by manipulating a user interface and a method of controlling the vehicle.

BACKGROUND

Basic functions for vehicles include high speed, reliable braking force, and precise steering functions. Additionally, various comfort systems are installed in a vehicle, which do not have a direct effect on basic functions of the vehicle but allow a driver to more easily and comfortably drive the vehicle.

Since being comparatively easy and simple to manipulate, windshield wipers, power windows, lightings, which are typical comfort systems, do not greatly distract a driver's attention. However, comfort systems mixed with various functions, such as functions of audio video navigation (AVN) apparatuses, may slightly distract a driver's attention while driving, due to various functions and complicated manipulation thereof.

SUMMARY

Therefore, it is an aspect of the present disclosure to provide controlling for a vehicle to be driven more safely by considering a manipulation load amount for operating a function of the vehicle when a user manipulates a user interface of the corresponding function to perform.

Additional aspects of the disclosure will be set forth in part in the description which follows and, in part, will be obvious from the description, or may be learned by practice of the disclosure.

In accordance with one aspect of the present disclosure, a vehicle includes a storage configured to store information on sizes of manipulation loads for a plurality of user interfaces for using a plurality of functions of the vehicle, and a controller configured to perform safe driving control corresponding to a size of a manipulation load of a corresponding function from the plurality of functions when a user interface from the plurality of user interfaces is manipulated to use at least one of the plurality of functions of the vehicle.

The size of the manipulation load for the function from the plurality of functions is determined based on a number of levels from a top level menu to a bottom level menu for the function.

The manipulation load comprises a value for the function, the value obtained by estimating an amount of information to be input by a user to perform the function.

The manipulation load may be updated as a new value in consideration of a frequency and time of manipulating the function by the user.

The vehicle may further include an advanced driver assistance system (ADAS) to be involved in driving of the vehicle and to assist the driving. Here, the safe driving control corresponding to the size of the manipulation load comprises controlling a degree of involvement of the ADAS according to the size of the manipulation load.

The degree of involvement of the ADAS advances or delays a point in time of the involvement of the ADAS.

The degree of involvement of the ADAS may increase or decrease a reference for determining the involvement of the ADAS.

In accordance with another aspect of the present disclosure, a vehicle includes a storage configured to store information on sizes of manipulation loads for a plurality of user interfaces for using a plurality of functions of the vehicle; a display configured to display the user interfaces; and a controller configured to display icons representing the plurality of functions of the vehicles, respectively, on the display while legibility of the icons is being differentiated according to the sizes of the manipulation loads.

The display of the icons while the legibility of the icons is being differentiated may include designating the manipulation loads of the icons by numbers, respectively.

The display of the icons while the legibility of the icons is being differentiated comprises displaying the icons with different sizes based on size of a manipulation load of a corresponding function of the plurality of functions.

The display of the icons while the legibility of the icons is being differentiated comprises additionally displaying bar-shaped graphic elements to symbolically indicate the sizes of the manipulation loads of the icons.

In accordance with another aspect of the present disclosure, a vehicle includes a storage for storing information on sizes of manipulation loads for user interfaces for using functions of the vehicle, and a controller generating a warning differentiated according to the manipulation load of a selected function when the user interface of the plurality of user interfaces is manipulated to use at least one of the plurality of functions of the vehicle.

The warning may be formed of an alarm sound having a volume corresponding to the size of the manipulation load.

The warning may include an announcement including information on the size of the manipulation load.

In accordance with another aspect of the present disclosure, a vehicle includes a storage for storing information on sizes of manipulation loads for user interfaces for using functions of the vehicle, and a driving environment detection unit configured to detect a driving environment for the vehicle, wherein the controller is configured to assign a weight in consideration of the driving environment for the vehicle to the manipulation loads and perform safe driving control corresponding to the manipulation load of the corresponding function from the plurality of functions, the weight is assigned to the manipulation load when the user interface of the plurality of user interfaces is manipulated to use at least one of the plurality of functions of the vehicle.

The assignment of the weight in consideration of the driving environment comprises increasing the weight in a driving environment that needs relatively more attention of a user, and decreasing the weight in a driving environment that needs relatively less attention of the user.

In accordance with another aspect of the present disclosure, a method of controlling a vehicle includes storing information on sizes of manipulation loads for user interfaces to use functions of the vehicle and performing, when the user interface is manipulated to use at least one of the functions of the vehicle, safe driving control corresponding to the size of the manipulation load of the corresponding function.

The size of the manipulation load may be determined based on the number of levels from a top level menu to a bottom level menu for each function.

The manipulation load may include a value for each function, the value obtained by estimating an amount of information to be input by a user to perform the corresponding function.

The manipulation load may be updated as a new value in consideration of the frequency and time of manipulating the corresponding function by the user.

The method may further include activating an ADAS provided to be involved in driving of the vehicle and to assist the driving. Here, the safe driving control corresponding to the size of the manipulation load may include differently controlling a degree of involvement of the ADAS according to the size of the manipulation load.

The degree of involvement of the ADAS may advance or delay a point in time of the involvement of the ADAS.

The degree of involvement of the ADAS may increase or decrease a reference for determining the involvement of the ADAS.

The method may further include displaying the user interfaces and displaying, when displaying the user interface on the display, icons representing the functions of the vehicles, respectively, on the display while the legibility of the icons is being differentiated according to the sizes of the manipulation loads.

The method may further include storing the information on the size of the manipulation load for the user interface and generating a warning differentiated according to the manipulation load of the selected function when the user interface is manipulated to use at least one of the functions of the vehicle.

The method may further include storing the information on the size of the manipulation load for the user interface, detecting a driving environment for the vehicle, and assigning, when the user interface is manipulated to use at least one of the functions of the vehicle, a weight in consideration of the driving environment for the vehicle to the manipulation load and performing safe driving control corresponding to the manipulation load of the corresponding function, the manipulation load weighted.

BRIEF DESCRIPTION OF THE DRAWINGS

These and/or other aspects of the disclosure will become apparent and more readily appreciated from the following description of the embodiments, taken in conjunction with the accompanying drawings.

DETAILED DESCRIPTION

Figure 1:
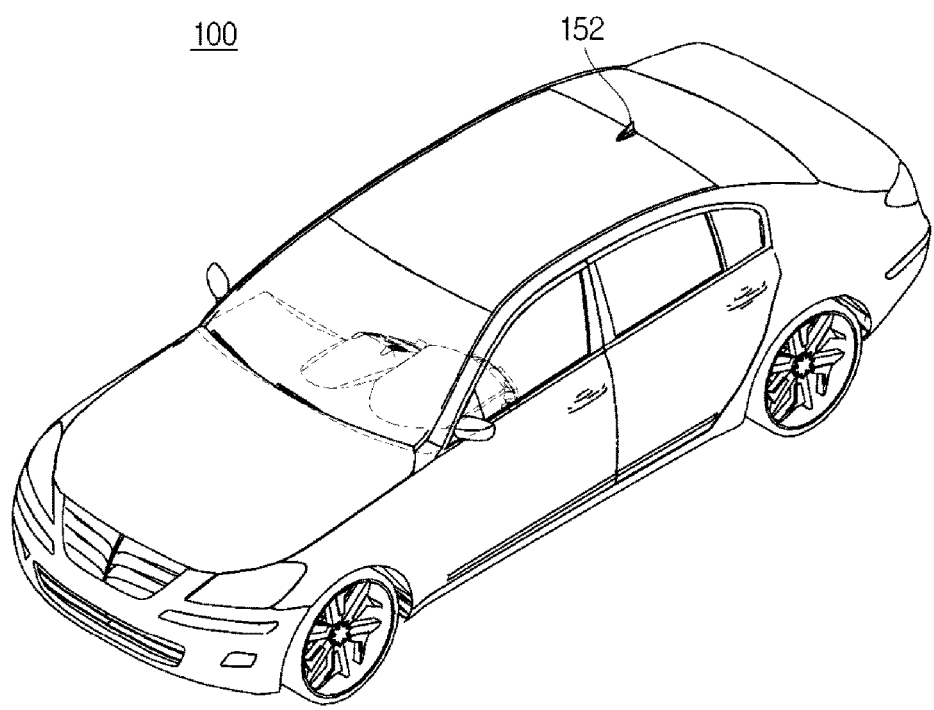
FIG. 1 is a diagram of a vehicle, in accordance with one embodiment of the present invention.

Reference will now be made in detail to the embodiments of the present invention, examples of which are illustrated in the accompanying drawings, wherein like reference numerals refer to like elements throughout.

FIG. 1 is a diagram of a vehicle 100, in accordance with one embodiment of the present invention. An antenna 152 for communication is installed on the roof of vehicle 100. Also, one or more advanced driver assistance systems (ADASs) provided to be involved in driving the vehicle 100 together with basic components for vehicle driving and to assist the driving, are installed inside the vehicle 100. ADAS enables a driver to drive vehicle 100 more safely and comfortably. Multiple ADASs may be installed in a vehicle 100. One or more of the ADASs may be activated by a choice of a user or a driver. The ADASs are as follows.

A smart cruise control (SCC) apparatus allows a vehicle to automatically drive at a constant speed without pressing an accelerator while driving when a driver sets a desirable driving speed. When a preceding vehicle stops or reduces a speed, although the driver does not press a brake pedal, the vehicle may reduce the speed or stop by itself, thereby automatically controlling a distance between vehicles.

An autonomous emergency braking (AEB) apparatus is a safety device that operates when a preceding vehicle reduces a speed or stops or obstacles such as pedestrians suddenly appear. The AEB apparatus generates a warning to the driver or autonomously operates the brake to prevent rear-end collisions or to minimize damage thereof.

A forward collision warning (FCW) apparatus recognizes preceding vehicles and lanes while driving and generates a warning when a danger of collision occurs.

A lane departure warning system (LDWS) warns a driver when a vehicle begins to move out of its lane due to drowsiness or careless driving and supports the driver to drive on a road without departing from a lane.

Other apparatuses assisting safety in driving may be additionally installed and operated. In accordance with one embodiment of the present invention, involvement points in time and involvement criteria may vary with a manipulation load of a function selected by the driver. The definition of the manipulation load will be described with reference to FIGS. 4 and 5.

Figure 2:
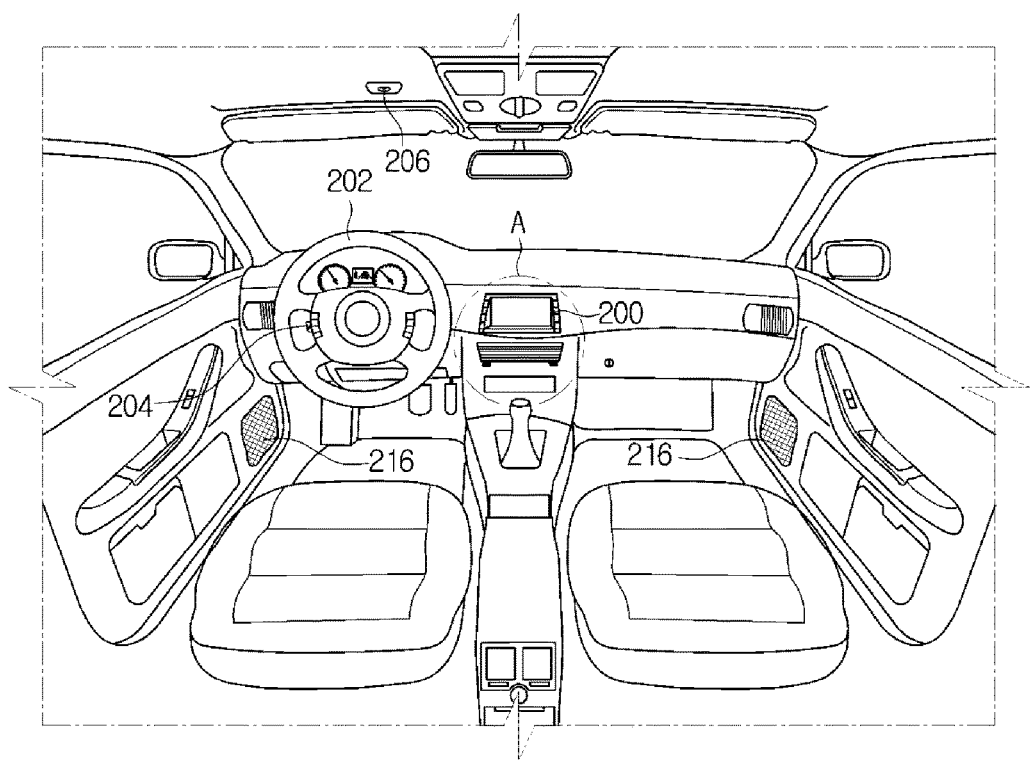
FIG. 2 is a diagram illustrating inside of the vehicle, in accordance with one embodiment of the present invention.

FIG. 2 is a diagram illustrating the inside of vehicle 100, in accordance with one embodiment of the present invention. As shown in FIG. 2, an AVN apparatus 200 and a steering wheel 202 are installed in front of the driver's seat.

In the AVN apparatus 200, audio, video, and navigation functions are integrated and a display 314 (shown in FIG. 3) is included. The AVN apparatus 200 operates based on a voice recognition control. For this, the steering wheel 202 includes a voice recognition button 204. Also, a microphone 206 is installed above the driver's seat. Speakers 216 are installed on the door to the left of the driver's seat and the door to the right of the passenger seat. The voice recognition button 204, the microphone 206, and the speakers 216 may be used as assisting tools for the voice recognition control of the AVN apparatus 200.

Figure 3:
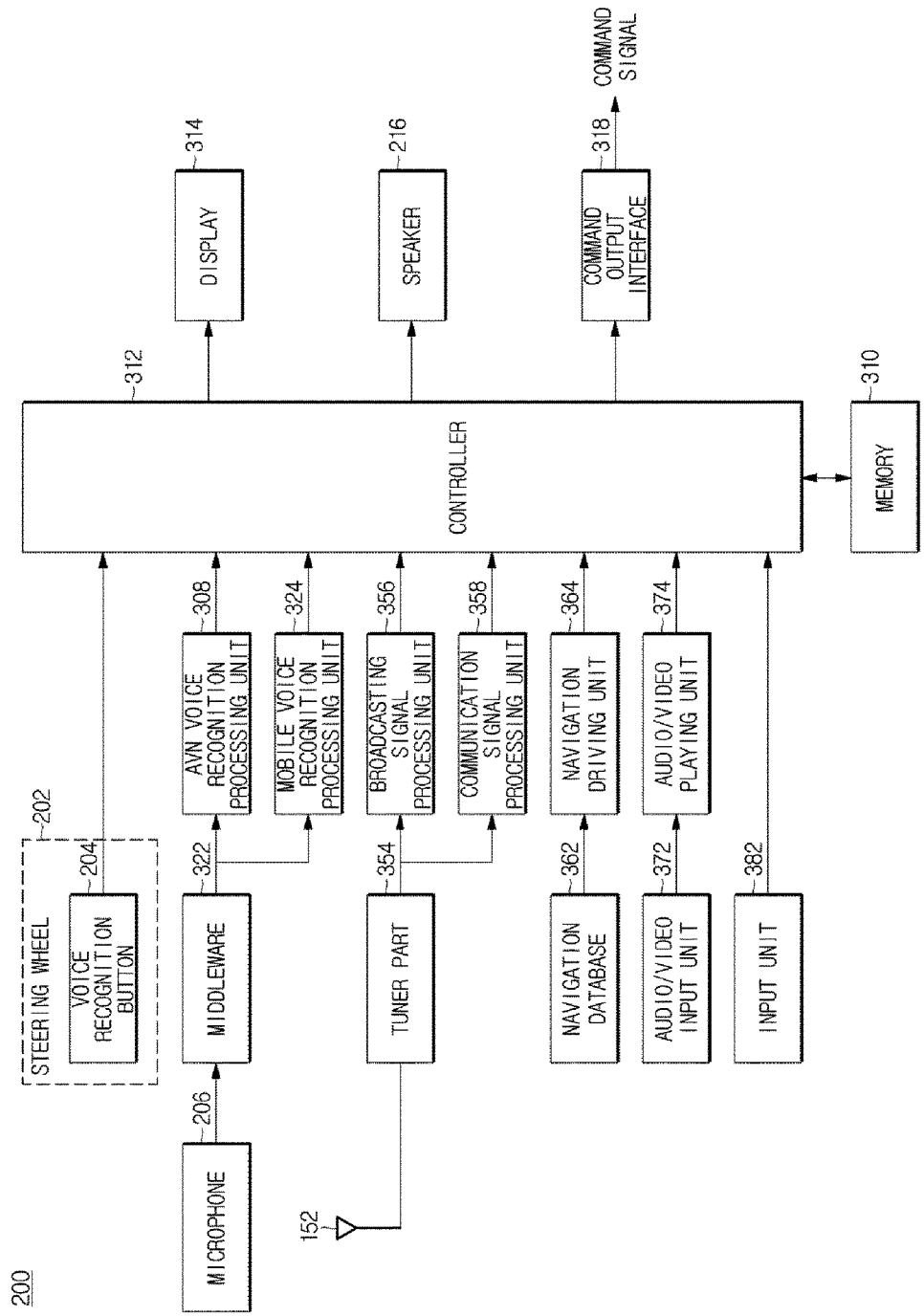
FIG. 3 is a diagram of an audio video navigation (AVN) configuration of the vehicle, in accordance with one embodiment of the present invention.

FIG. 3 is a diagram of configuration of the AVN apparatus 200, in accordance with one embodiment of the present invention. As shown in FIG. 3, the AVN apparatus 200 operates based on a voice recognition control. The configuration of the AVN apparatus 200 may be divided into a component for a voice recognition function, a component for a general input function, a component for a broadcasting/communication function, a component for a navigation function, a component for an audio/video function, and a component used in common for multiple functions.

Configuration of the voice recognition function may include the voice recognition button 204, the microphone 206, a middleware 322, a voice recognition processing unit 308, and a command output interface 318. Although not a component of the AVN apparatus 200, a mobile voice recognition processing unit 324 provided in a server remotely through a mobile terminal 252 as an external device may be communicably connected to the middleware 322 and a controller 312. The component for the broadcasting/communication function includes an antenna 152, a tuner part 354, a broadcasting signal processing unit 356, and a communication signal processing unit 358. The component for the navigation function includes a navigation database 362 and a navigation driving unit 364. The component for the audio/video function includes an audio/video input unit 372 and an audio/video playing unit 374. The component for the general input function includes an input unit 382. The component used in common for multiple functions includes a memory 310, the controller 312, the display 314, and the speakers 216. The classification depending on function described above is not limited thereto, but a component for any one function may be used for another function.

The voice recognition button 204 allows the driver to execute and use multiple functions of the AVN apparatus 200, such as an audio function, a video function, a navigation function, and an information communication function. For this, the voice recognition button 204 supports a push-to-talk (PTT) type single-key operation. The voice recognition button 204 may be installed on the steering wheel 202 to allow the driver to conveniently operate the same while driving. The steering wheel 202 is a steering apparatus used to change a driving direction of a vehicle by moving wheels thereof. Since a driver always grips the steering wheel 202 while driving, when the voice recognition button 204 is installed on the steering wheel 202, the driver may conveniently manipulate the voice recognition button 204. In addition to the steering wheel 202, the voice recognition button 204 may be installed in any position reachable to the driver to easily manipulate the voice recognition button 204.

The microphone 206 receives a voice signal spoken by the driver and converts the received voice signal into an electric signal while the voice recognition control function is being executed. The microphone 206 may be a microphone exclusively provided for the voice recognition control or may share a microphone for a hands-free device of a vehicle. Also, the microphone 206 may be a microphone of a mobile terminal that the driver carries. When using the microphone of the mobile terminal, the mobile terminal and the AVN apparatus 200 may be connected to each other through a local area network such as Bluetooth.

The voice recognition processing unit 308 receives the electric signal converted by the microphone 206 via the middleware 322, performs voice recognition with respect to the converted electric signal, and extracts text data as voice command information as a result of the voice recognition. The text data extracted by the voice recognition processing unit 308 is transmitted to the middleware 322 before being transmitted to the controller 312.

The middleware 322 is a relay unit and can determine whether the text data transmitted from the voice recognition processing unit 308 is a reserved word for the voice recognition control of the AVN apparatus 200 or a reserved word for the voice recognition control of the mobile terminal 252.

The middleware 322 transmits the text data to the controller 312 of the AVN apparatus 200 to perform the voice recognition control of the AVN apparatus 200, when the text data is the reserved word for the voice recognition control of the AVN apparatus 200. On the other hand, when the text data is not the reserved word for voice recognition control of the AVN apparatus 200, the text data is transmitted to the mobile terminal 252 to perform the voice recognition control of the mobile terminal 252. That is, the middleware 322 determines autonomously whether the voice signal generated by the articulation of the driver is the reserved word for the voice recognition control of the AVN apparatus 200 or the reserved word for the voice recognition control of the mobile terminal 252 and relays thereto. In this process, the intended involvement of the driver to distinguish the reserved word for the voice recognition control of the AVN apparatus 200 from the reserved word for the voice recognition control of the mobile terminal 252 is unnecessary.

The command output interface 318 is to transmit a control command signal corresponding to the voice command information extracted as the voice recognition result from the controller 312 to an apparatus to be controlled.

The antenna 352 is a device for receiving a radio signal or transmitting a radio signal through the air in order to receive or transmit one of a broadcasting signal and a communication signal. The antenna 352 is communicably connected to the tuner part 354. Accordingly, radio waves received by the antenna 352 are transmitted to the tuner part 354. The antenna 352 may be formed in a set for multiple broadcasting/communication signals having mutually different forms.

The tuner part 354 converts radio waves received by the antenna 352 into intermediate frequency signals. Also, the tuner part 354 converts a data signal to be transmitted into a form capable of propagating through the air to be transmitted through the air via the antenna 352. That is, the tuner part 354 extracts signals in a certain band or mixes a carrier signal with a data signal. The tuner part 354 receives broadcasting signals and transmits and receives communication signals. Broadcasting signals may include radio broadcasting signals and digital multimedia broadcasting (DMB) signals. Communication signals may include satellite communication signals with global positioning system (GPS) satellites. Also, communication signals may include communication signals for telematics. It is determined whether which signal is to be received and processed by the tuner part 354 according to a control signal transmitted from the controller 312 to the tuner part 354. For example, when a control signal is transmitted from the controller 312 to the tuner part 354 to receive radio broadcasting signals of a specific channel, the tuner part 354 receives radio broadcasting signals of the corresponding channel in response to the control signal transmitted from the controller 312. When the controller 312 transmits a control signal for transmitting a telematics signal and transmission data to the tuner part 354, the tuner part 354 converts the transmission data into a form capable of being transmitted through the air and transmits the converted signal through the air via the antenna 352. Also, the tuner part 354 obtains information of a broadcasting channel included in the broadcasting signals. The broadcasting signals input into the tuner part 354 include a title of a broadcasting channel, a service identification (ID), and broadcasting data. The tuner part 354 extracts and transmits the title of the broadcasting channel, the service ID, and broadcasting data included in the broadcasting signals to the broadcasting signal processing unit 356 and the controller 312.

The broadcasting signal processing unit 356 classifies broadcasting signals passing through the tuner part 354 into video broadcasting signals and audio broadcasting signals and performs a series of signal processing. The series of signal processing performed by the broadcasting signal processing unit 356 may include analog-to-digital conversion, digital-to-analog conversion, and conversion from video data into signals having a form capable of driving the display 314.

The communication signal processing unit 358 processes communication signals with GPS satellites and telematics-based communication signals. That is, the communication signal processing unit 358 converts the received communication signals into a form of data for being transmitted to the controller 312 or receives and converts data to be transmitted through the tuner part 354 and the antenna 352 from the controller 312 into signals having a communicable form.

The navigation database 362 includes data for performing navigation. The navigation database 362 may have a form of one of a memory card and a digital versatile disc (DVD). Also, navigation data provided from a mobile terminal connected through a wired/wireless link such as CarPlay or Android Auto may be used as a navigation database.

The navigation driving unit 364 forms a navigation screen on the display 314 using data provided from the navigation database 362. For this, navigation setting information such as a destination, stops, and a route set by the user is provided from the controller 312. Also, present location information of the vehicle 102 obtained through communication with GPS satellites to perform navigation is provided from the controller 312.

The audio/video input unit 372 may be an optical disc drive (ODD). Also, the audio/video input unit 372 may be one of a Universal Serial Bus (USB) input device and an auxiliary input/output terminal called AUX. Otherwise, the audio/video input unit 372 may be a Bluetooth device for wireless communication with a mobile terminal. The mobile terminal in communication with the audio/video input unit 372 through Bluetooth may be one of a mobile phone and a portable digital music player.

The audio/video playing unit 374 allows audio/video data input through the audio/video input unit 372 to be output to one of the speaker 216 and the display 314. For example, when the audio/video input unit 372 is an ODD, the ODD reads and extracts audio/video data recorded on an optical disc such as a compact disc (CD), a DVD, and a Blu-ray Disc (BD), the audio/video playing unit 374 converts the audio/video data extracted by the audio/video input unit 372 into signals having a form capable of driving one of the speaker 216 and the display 314 to play the audio/video data. Audio/video data provided from other media in addition to optical discs may be converted into signals having the form capable of driving one of the speaker 216 and the display 314 through the audio/video playing unit 374.

The input unit 382 may be one of at least one button provided on the AVN apparatus 200 and a touch screen provided on the display 314. A driver may select one of the multiple functions of the AVN apparatus 200 by operating the input unit 382 and may add various settings to perform an operation expected from the selected function. The voice recognition button 204 of the steering wheel 202 may be included in the at least one button forming the input unit 382.

The controller 312 is involved in overall operations of the AVN apparatus 200 and performs required control thereof. For example, in response to manipulating the voice recognition button 204, an initial entry screen is allowed to be displayed and a related voice guide message is allowed to be output by driving an application related to a voice recognition function of the memory 310. Also, the controller 312 receives voice command information provided from the voice recognition processing unit 308 and generates a control command corresponding to the voice command information, thereby allowing control corresponding to the voice command information. For example, the controller 312 may process broadcasting/communication signals. When audio/video data generated after processing broadcasting/communication signals is output to one of the speaker 216 and the display 314, corresponding audio/video data is controlled to be transmitted to one of the speaker 216 and the display 314, thereby allowing output of audio/video data. Also, when the driver selects a navigation function, the controller 312 controls the navigation database 362, the navigation driving unit 364, the display 314, and the speaker 216 to perform navigation. Also, the controller 312 controls audio/video data input through the audio/video input unit 372 to be played by the audio/video playing unit 374 and transmitted to one of the speaker 216 and the display 314, thereby allowing output of audio/video data. Also, the controller 312 converts the title of the broadcasting channel extracted by the tuner part 354 from broadcasting signals into a text and transmits the text to the voice recognition processing unit 308.

The memory 310 stores various applications executed to perform each of the broadcasting/communication function, the navigation function, and the audio/video function of the AVN 200, screen display data, voice data, and sound effect data to execute applications.

The display 314 outputs a video that accompanies the execution of multiple functions such as the voice recognition function, the broadcasting/communication function, the navigation function, and the audio/video function of the AVN apparatus 200. For example, a guide screen, messages, and video data, etc. for each function are output through the display 314. Also, the display 314 displays a user interface to allow the driver to operate multiple operations of the AVN apparatus 200. For example, user interfaces for the user to operate to perform the navigation function and the broadcasting (radio/DMB) provided on the AVN apparatus 200, an air-conditioning function, and the audio function in addition thereto are displayed on the display 314.

The speaker 216 outputs audio that accompanies the execution of multiple functions such as the voice recognition function, the broadcasting/communication function, the navigation function, and the audio/video function of the AVN apparatus 200. For example, a guide mention, sound effects, and audio data for each function are output through the speakers 216.

Figure 4:
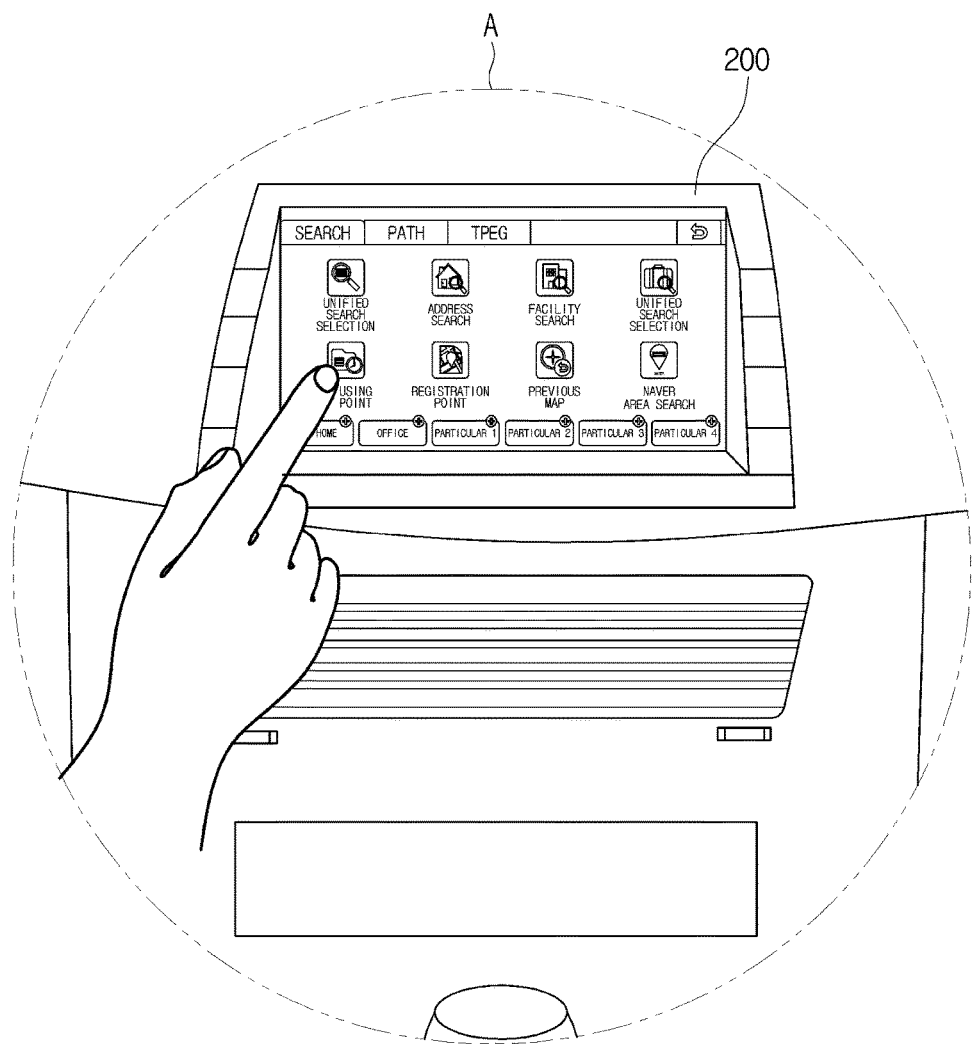
FIG. 4 is a diagram illustrating an example of a user interface displayed on a display of an AVN apparatus of the vehicle, in accordance with one embodiment of the present invention.

FIG. 4 is a diagram illustrating an example of a user interface displayed on the display 314 of the AVN apparatus 200 of vehicle 100. That is, FIG. 4 is an enlarged view of a circular part indicated as 'A' in FIG. 2. The user interface of FIG. 4 shows icons of various submenus, that is, subfunctions forming the navigation function when the user chooses the navigation function. The user may touch an icon corresponding to a desired function among multiple icons displayed on the display 314 to perform a corresponding subfunction.

Various apparatuses of the vehicle 100 include a user interface to manipulate by the user. In the AVN apparatus 200 in FIG. 4, it is possible to select any one of, for example, the navigation function, the broadcasting (radio/DMB) function, or the air-conditioning function. When one function is selected, submenus of the corresponding function are displayed on a user interface, thereby allowing the user to set up the submenus of the selected function. An example of a menu configuration of the user interface is shown in FIG. 5.

Figure 5:
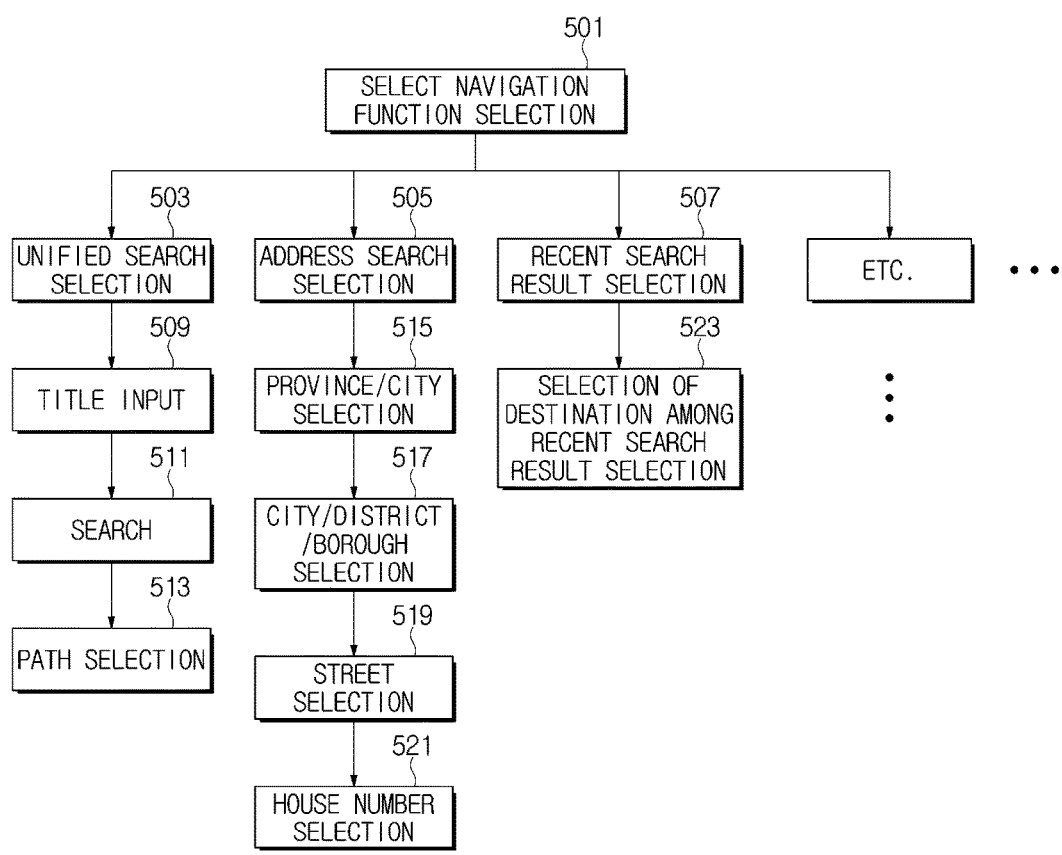
FIG. 5 is a diagram illustrating an example of a submenu configuration of each of various functions supported by the AVN apparatus of the vehicle, in accordance with one embodiment of the present invention.

FIG. 5 is a diagram illustrating an example of a submenu configuration of each of various functions supported by the AVN apparatus 200 of the vehicle 100 in accordance with one embodiment of the present invention. As shown in FIG. 5, when the user selects the navigation function (at 501), unified searches (503), address searches (505), recent search results (507), etc. are shown as submenus. To perform a unified search function, it is required for the user to sequentially operate subordinate menus such as title input (509), searches (511), path searches (513), etc. Also, to perform an address search function 505, it is required to sequentially operate subordinate menus such as province/city selection (515), city/district/borough selection (517), street selection (519), house number selection (521), etc. Also, to check recent search results 507 and select a destination among them, it is required to operate an icon called recent search result selection (523) and then operate a subordinate menu for selecting a desired destination (not shown) from a recent search result list displayed on the display 314.

As described above, to perform a particular function desired by the user, it is required to accompany manipulation on a user interface displayed on the display 314. Also, depending on the function, such as the navigation function, a complicated submenu configuration is included and data input for setting up a destination is accompanied. Accordingly, there is a great amount of manipulation for manipulating a user interface. On the other hand, in the case of the broadcasting function, compared with the navigation function, a configuration of a user interface is less complicated and there is a smaller amount of manipulation for manipulating the user interface by selecting a preset channel that is previously set up or using a channel search function. In the case of the air-conditioning function, compared with the navigation function or the broadcasting function, a submenu configuration is much less complicated and is accompanied by operating a much simpler user interface.

Accordingly, a manipulation amount for manipulating a user interface to perform each function from a set of functions supported by the vehicle 100 may be different for each function. In one embodiment of the present invention, a manipulation amount of a user interface required to perform each of the functions will be designated as a manipulation load. That is, an amount of the manipulation load mentioned herein may be determined based on the number of levels from a top level menu to a bottom level menu for each function. Also, the manipulation load may include a value obtained by estimating an amount of information to be input by the user to perform each corresponding function. The value may be updated as a new one in consideration of the frequency and time of operating the corresponding function by the user. The manipulation load as described above is stored in a storage 804 (refer to FIG. 8) as one of a lookup table and a database.

The manipulation load will be described in detail as follows. That is, a default value of the manipulation load is determined based on a depth of a user interface and an information input estimation value. The depth of the user interface indicates the number of menu levels from a top level menu to a bottom level menu for each function. The information input estimation value is a value obtained by estimating an amount of information to be input by the user to perform the corresponding function and may be a value of a general case which is experimentally obtained. The manipulation load is set up as a default value at the point in time of releasing the vehicle 100. However, the default value of the manipulation load stored in the storage 804 may be updated as another value in consideration of actual frequency and time of operating the corresponding function by the user. That is, when the user more frequently operates a specific function or operates the function for a longer time, the manipulation load of the corresponding function is newly updated in consideration of the frequency and time of manipulation. For example, in the case of the navigation function that needs a lot of text input to set up a destination, since a text input speed may vary with users, the manipulation load of the navigation function stored in the storage 804 may be updated to increase or decrease by considering the accumulated data of a text input speed for each user. Accordingly, manipulation load data in the storage 804 may be one of a default value at the point in time of releasing the vehicle 100 and an up-to-date value obtained by considering a manipulation history of the user.

Figure 6:
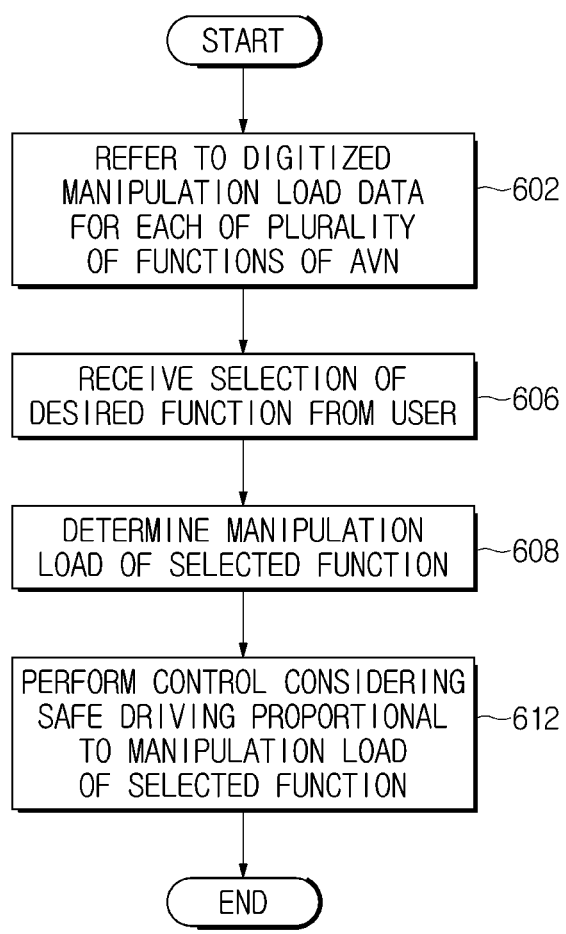
FIG. 6 is a flowchart illustrating a first method for controlling the vehicle, in accordance with one embodiment of the present invention.

FIG. 6 is a flowchart illustrating a first embodiment of a method of controlling the vehicle 100 in accordance with one embodiment of the present invention. The method of FIG. 6 performs safe control considering a manipulation load for each function of the AVN apparatus 200. That is, digitized manipulation load data of each function from a set of functions of the AVN apparatus 200 is referred to, a selection for a desired function is received from a user, a manipulation load of a selected function is determined, and control considering safe driving proportional to the manipulation load of the selected function is performed.

As shown in FIG. 6, an electronic controller (ECU) 802 (shown in FIG. 8) corresponding to a main controller of the vehicle 100 refers to manipulation load data for each function stored as digitized data with respect to each of the functions of the AVN apparatus 200 in the storage 804 (at 602). That is, the ECU 802 maintains in a communication state with the storage 804 in order to withdraw and refer to the manipulation load data for each function at any time.

When the user selects a desired function by operating the AVN apparatus 200, the ECU 802 receives information on which function is selected by the user (at 606). That is, the ECU 802 receives data having a form of electric signals generated when the user manipulates a user interface to perform the desired function, thereby recognizing which function relates to the manipulation of the user. Also, the ECU 802 determines an amount of the manipulation load of the function selected by the user by referring to the manipulation load data in the storage 804 (at 608).

The ECU 802 performs control considering safe driving proportional to the manipulation load of the selected function (at 612). Here, the control considering safe driving may include at least one of a set of safe driving controls including more aggressive involvement of ADASs, differentiation in legibility of an icon for each function, a level of warning proportional to a manipulation load for each function, and assigning a weight to the manipulation load considering a driving environment.

Figure 7:
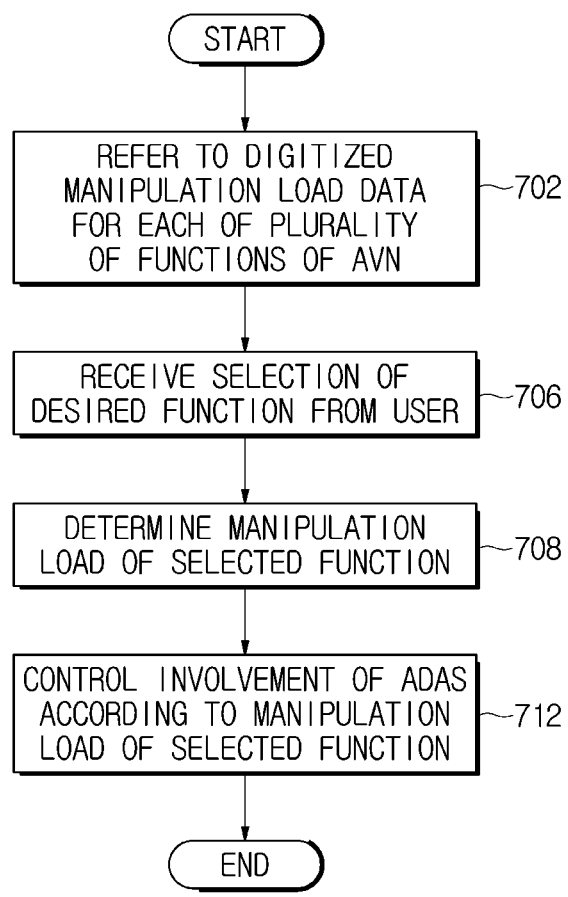
FIG. 7 is a flowchart illustrating a second method for controlling the vehicle, in accordance with an embodiment of the present invention.

FIG. 7 is a flowchart illustrating a second embodiment of a method of controlling the vehicle 100 in accordance with one embodiment of the present invention. The method of FIG. 7 performs safe control considering a manipulation load for each function of the AVN apparatus 200. That is, digitized manipulation load data of each function from a set of functions of the AVN apparatus 200 is referred to, a selection for a desired function is received from a user, a manipulation load of a selected function is determined, and ADASs are controlled to allow safer driving according to the manipulation load of the selected function.

As shown in FIG. 7, the ECU 802 corresponding to a main controller of the vehicle 100 refers to manipulation load data for each function stored as digitized data with respect to each of the functions of the AVN apparatus 200 in the storage 804 (at 702). That is, the ECU 802 maintains in a communication state with the storage 804 in order to withdraw and refer to the manipulation load data for each function at any time.

When the user selects a desired function by operating the AVN apparatus 200, the ECU 802 receives information on which function is selected by the user (at 706). That is, the ECU 802 receives data having a form of electric signals generated when the user manipulates a user interface to perform the desired function, thereby recognizing which function relates to the manipulation of the user. Also, the ECU 802 determines an amount of the manipulation load of the function selected by the user by referring to the manipulation load data in the storage 804 (at 708).

The ECU 802 controls ADASs to allow safer driving according the manipulation load of the selected function (at 712). Here, the control to allow safer driving may include moving up an involvement point in time of ADASs when the manipulation load is greater and providing safe driving by applying more rigorous involvement criteria. For this, the ECU 802 transmits a safe control parameter value corresponding to the manipulation load selected by the user to control ADASs to a currently activated ADAS, which is shown in FIG. 8.

Figure 8:
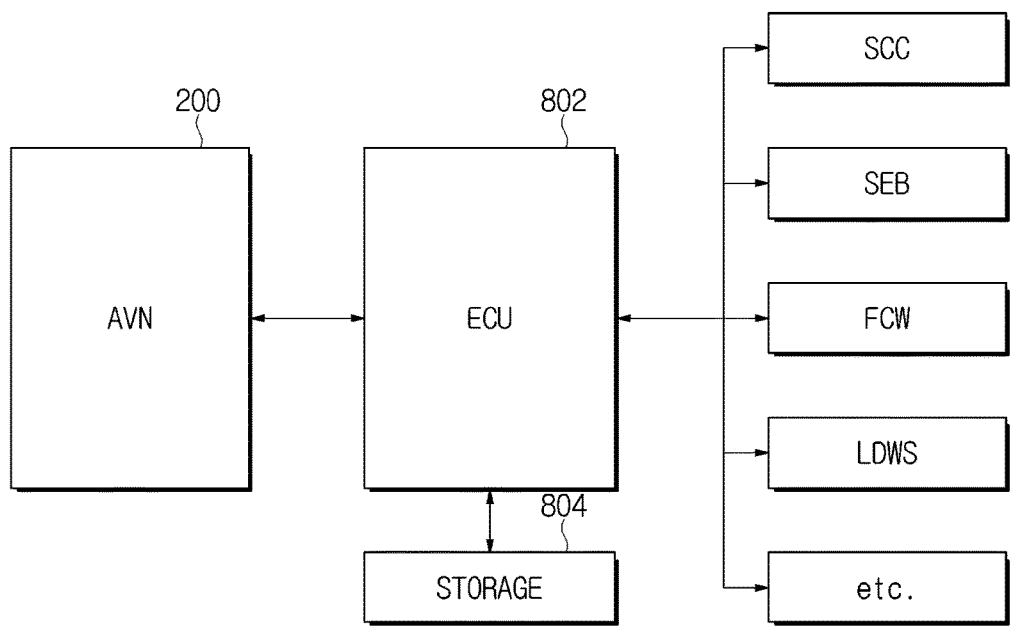
FIG. 8 is a diagram of a control system for the method of FIG. 7.

FIG. 8 is a diagram of a control system for the method of FIG. 7. As shown in FIG. 8, the ECU 802 including the storage 804 receives information related to user interface manipulation of the user from the AVN apparatus 200 connected to an input side. Also, the ECU 802 analyzes the information related to user interface manipulation of the user, determines a manipulation load of a desired function to be presently performed by referring to the storage 804, and controls one or more ADASs such as an SCC apparatus, an AEB apparatus, an FCW apparatus, and an LDWS depending on an amount of the manipulation load of the corresponding function.

For example, while the AEB apparatus is being activated as an ADAS, when manipulation of the user to perform the navigation function of the AVN apparatus 200, which has a relatively greater manipulation load, is performed, the ECU 802 increases a control value of a parameter related to a braking distance of the AEB apparatus to allow braking to more quickly begin, that is, moves a point in time of involvement of the AEB apparatus in braking earlier than usual. As another example, while the LDWS is being activated as an ADAS, when manipulation of the user to perform the navigation function of the AVN apparatus 200, which has a relatively greater manipulation load, is performed, the ECU 802 changes a reference distance between the vehicle 100 and a lane to determine a lane-departure of the vehicle 100 to be shorter than usual, that is, to be safer than usual to perform lane departure determination more rigorously than usual, that is, to apply more rigorous involvement criteria. While multiple of ADASs are being activated, the ECU 802 allows an ADAS having a more direct effect on safe driving to be preferably involved.

Figure 9:
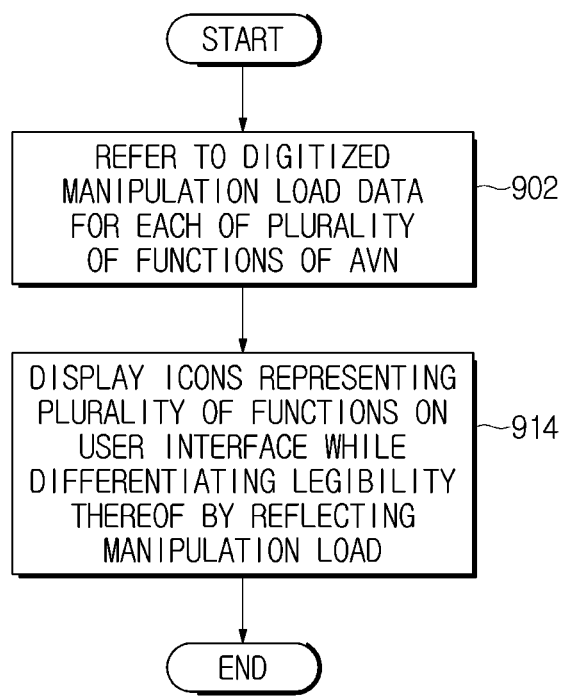
FIG. 9 is a flowchart illustrating a third method for controlling the vehicle, in accordance with an embodiment of the present invention.

FIG. 9 is a flowchart illustrating a third embodiment of a method of controlling the vehicle 100 in accordance with one embodiment of the present invention. In the method of FIG. 9, when the user interface of the AVN apparatus 200 is displayed on the display 314, an icon representing each function from a set of functions of the vehicle 100 is displayed on the display 314 while legibility of the icon is being differentiated depending on the size of a manipulation load.

As shown in FIG. 9, the ECU 802 corresponding to a main controller of the vehicle 100 refers to manipulation load data for each function stored as digitized data with respect to each of the functions of the AVN apparatus 200 in the storage 804 (at 902). That is, the ECU 802 maintains in a communication state with the storage 804 in order to withdraw and refer to the manipulation load data for each function at any time. The ECU 802 may show the legibility of the icon of each of the functions on the user interface displayed on the display 314 of the AVN apparatus 200 in consideration of a manipulation load thereof while showing (at 914).

Figure 10A:
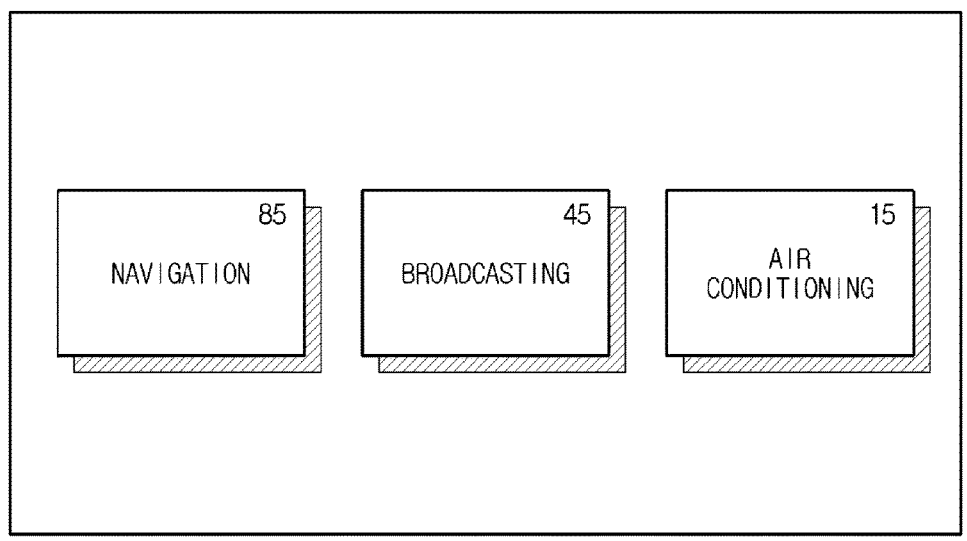
FIGS. 10A-10C are example diagrams of displaying icons for respective functions in the third method of FIG. 9.
Figure 10B:
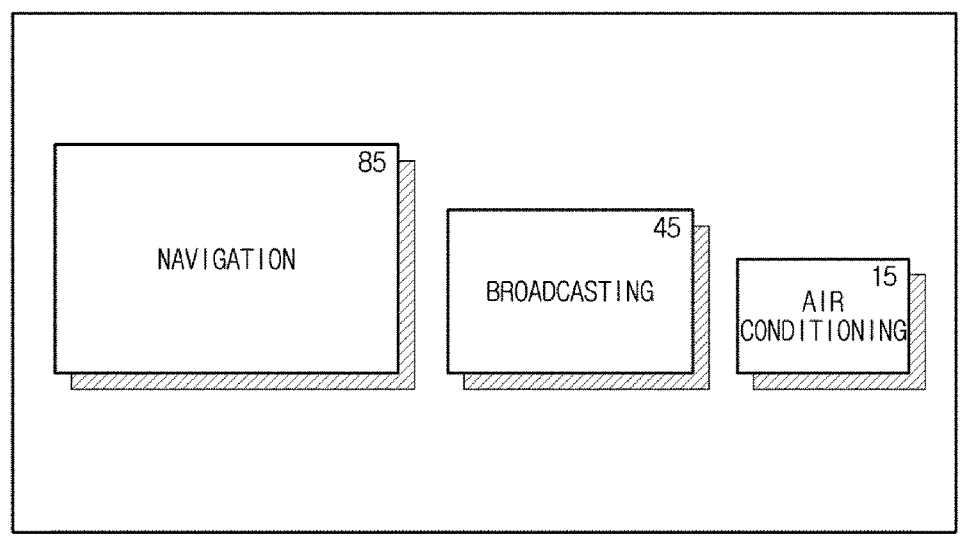
Figure 10C:
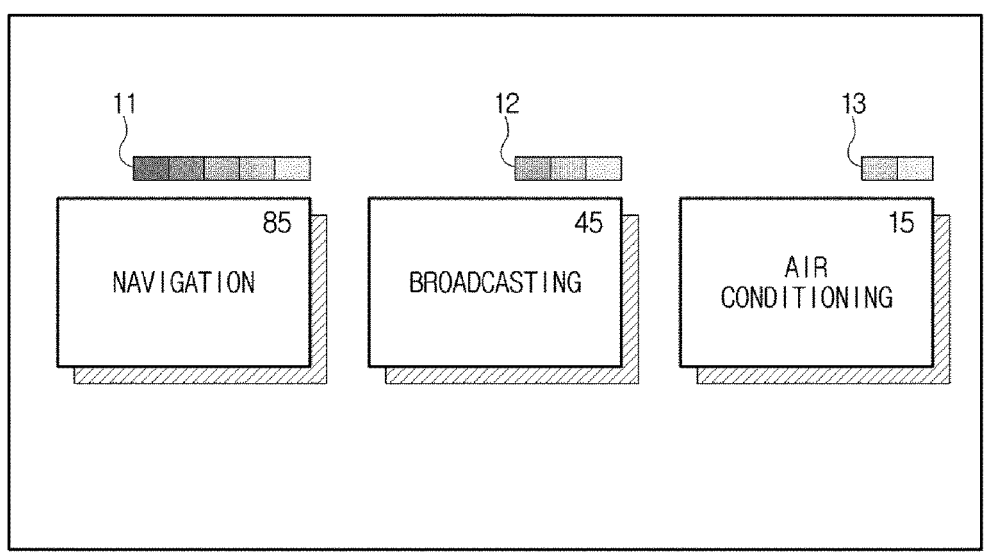

FIGS. 10A-10C are diagrams of examples of displaying icons for respective functions in the method of FIG. 9. For example, as shown in FIG. 10A, the ECU 802 may display the sizes of manipulation loads using digits on the icons representing the functions of the AVN apparatus 200, respectively, such as the navigation 85, the broadcasting 45, and the air conditioning 15. Also, for example, as shown in FIG. 10B, the ECU 802 may display the icons of which sizes are differentiated to be proportional to manipulation loads thereof. Also, for example, as shown in FIG.10C, the ECU 802 may display sizes of manipulation loads of the icons representing the functions, respectively, by applying bar-shaped graphic elements 11, 12 and 13. In addition, the density in color of the icon representing each of the functions may be displayed while being differentiated to be proportional to the manipulation load. For example, the density of color may be displayed darker when a manipulation load is greater and may be displayed dimmer when the manipulation load is smaller.

Figure 11:
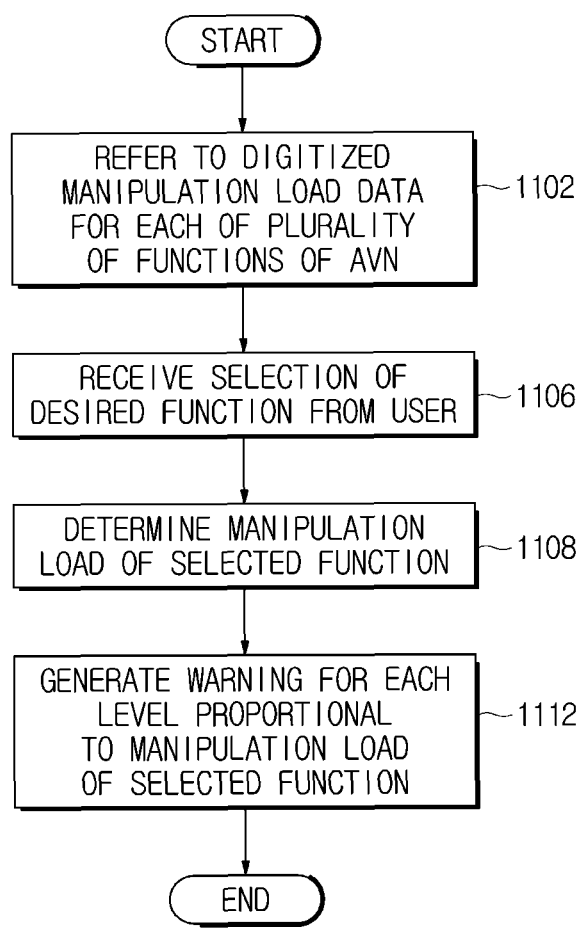
FIG. 11 is a flowchart illustrating a fourth method of controlling the vehicle, in accordance with one embodiment of the present invention.

FIG. 11 is a flowchart illustrating a fourth embodiment of a method of controlling the vehicle 100 in accordance with one embodiment of the present invention. The method of FIG. 11 generates a warning for each level by considering a manipulation load for each function of the AVN apparatus 200. That is, digitized manipulation load data of each function from a set of functions of the AVN apparatus 200 is referred to, a selection for a desired function is received from a user, a manipulation load of a selected function is determined, and the user's attention is grabbed by generating a warning differentiated according to the manipulation load of the selected function.

As shown in FIG. 11, the ECU 802 corresponding to a main controller of the vehicle 100 refers to manipulation load data for each function stored as digitized data with respect to each of the functions of the AVN apparatus 200 in the storage 804 (1102). That is, the ECU 802 maintains in a communication state with the storage 804 in order to withdraw and refer to the manipulation load data for each function at any time.

When the user selects a desired function by operating the AVN apparatus 200, the ECU 802 receives information on which function is selected by the user (1106). That is, the ECU 802 receives data having a form of electric signals generated when the user manipulates a user interface to perform the desired function, thereby recognizing which function relates to the manipulation of the user. Also, the ECU 802 determines an amount of the manipulation load of the function selected by the user by referring to the manipulation load data in the storage 804 (1108).

The ECU 802 generates a warning differentiated according to the manipulation load of the selected function (1112). Here, to generate the warning may be to sound an alarm. In this case, the ECU 802 may change a volume of an alarm sound to be proportional to the size of the manipulation load. Also, to generate the warning may be a form of an announcement. In this case, the ECU 802 may change the contents of the announcement depending on the size of the manipulation load.

Figure 12:
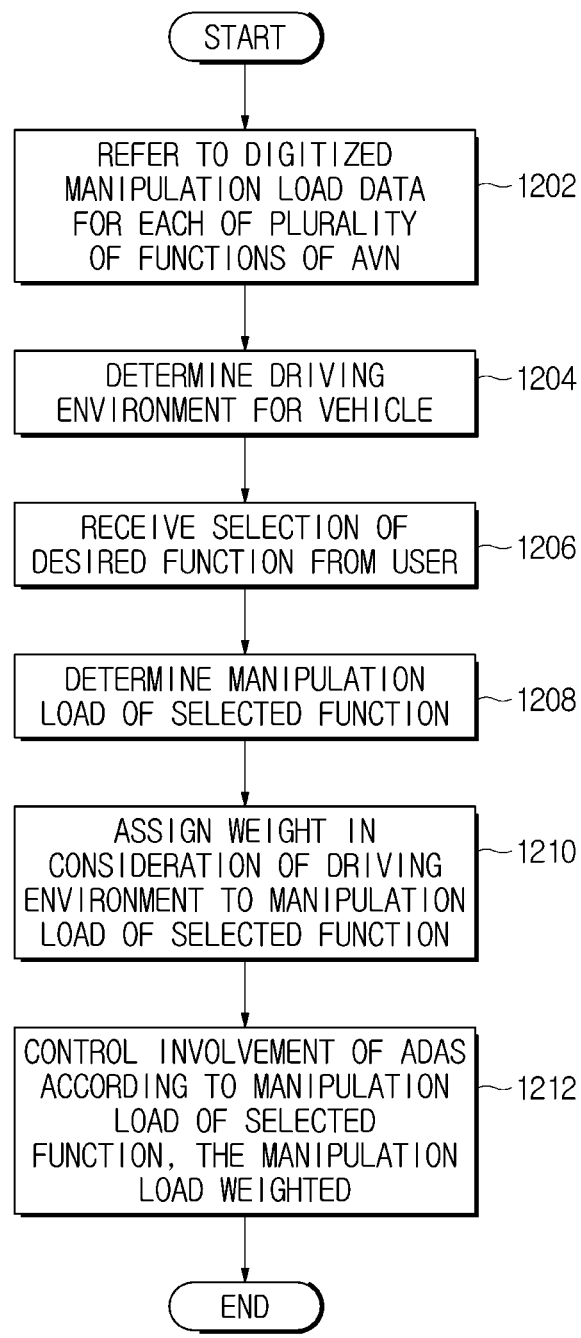
FIG. 12 is a flowchart illustrating a fifth method of controlling the vehicle, in accordance with one embodiment of the present invention.

FIG. 12 is a flowchart illustrating a fifth embodiment of a method of controlling a vehicle in accordance with one embodiment of the present invention. The method of FIG. 12 assigns a weight considering a driving environment to a manipulation load for each function of the AVN apparatus 200 and performs safe control considering the manipulation load weighted. That is, digitized manipulation load data of each function from a set of functions of the AVN apparatus 200 is referred to, a selection for a desired function is received from a user, a manipulation load of a selected function is assigned a weight considering a driving environment, and the ADASs are controlled to allow safer driving according to the manipulation load of the selected function, the manipulation load weighted.

As shown in FIG. 12, the ECU 802 corresponding to a main controller of the vehicle 100 refers to manipulation load data for each function stored as digitized data with respect to each of the functions of the AVN apparatus 200 in the storage 804 (1202). That is, the ECU 802 maintains in a communication state with the storage 804 in order to withdraw and refer to the manipulation load data for each function at any time.

Also, the ECU 802 detects and determines a peripheral environment of a location in which the vehicle 100 is driving, that is, a driving environment (1204). That is, it is determined whether the vehicle 100 is driving on a straight broad road, how long a distance from a preceding vehicle is, whether a road is curved, whether the vehicle 100 is driving through a tunnel, or whether traffic on a road is congested. Here, a driving environment detection unit for determining the driving environment for the vehicle 100 may be provided as follows. For example, it is possible to determine the peripheral topography of the vehicle 100, such as a straight section, a curved section, and a tunnel section, using navigation map information. Also, it is possible to determine whether the vehicle is driving in a congested section using traffic information provided by transport protocol expert group (TPEG). Also, it is possible to determine a distance from a preceding vehicle using ADASs such as the AEB apparatus and the LDWS.

When the user selects a desired function by operating the AVN apparatus 200, the ECU 802 receives information on which function is selected by the user (1206). That is, the ECU 802 receives data having a form of electric signals generated when the user manipulates a user interface to perform the desired function, thereby recognizing which function relates to the manipulation of the user. Also, the ECU 802 determines an amount of a manipulation load of the function selected by the user by referring to the manipulation load data in the storage 804 (1208).

The ECU 802 assigns a weight considering a driving environment to the manipulation load of the selection function, which is presently stored in the storage 804 (1210). That is, a higher weight is assigned in a driving environment that needs considerable attention such as a curved section and a tunnel and a relatively lower weight is assigned to a relatively smoother driving environment.

The ECU 802 controls the ADAS to allow safer driving according to the manipulation load of the selected function, the manipulation load being weighted (1212). Here, the control to allow safer driving may include moving up an involvement point in time of the ADAS when the manipulation load is greater and providing safer driving by applying more rigorous involvement criteria.

As is apparent from the above description, in accordance with one aspect of the present disclosure, a vehicle is safely controlled by considering a manipulation load amount for operating a specific function of the vehicle when a user manipulates a user interface of the function, thereby providing safer driving of the vehicle.

Although a few embodiments of the present invention have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
 a storage configured to store information on sizes of manipulation loads for a plurality of user interfaces for using a plurality of functions of the vehicle; and
 a controller configured to perform safe driving control corresponding to a size of a manipulation load of a corresponding function from the plurality of functions when a user interface from the plurality of user interfaces is manipulated to use at least one of the plurality of functions of the vehicle,
 wherein the manipulation load comprises a value for the function, the value obtained by estimating an amount of information to be inputted by a user to perform the function, and
 wherein the manipulation load is updated as a new value in consideration of a frequency and time of manipulating the function by the user.

2. The vehicle of claim 1, wherein the size of the manipulation load for the function from the plurality of functions is determined based on a number of levels from a top level menu to a bottom level menu for the function.

3. The vehicle of claim 1, further comprising an advanced driver assistance system (ADAS) to be involved in driving of the vehicle and to assist the driving,
 wherein the safe driving control corresponding to the size of the manipulation load comprises controlling a degree of involvement of the ADAS according to the size of the manipulation load.

4. The vehicle of claim 3, wherein the degree of involvement of the ADAS advances or delays a point in time of the involvement of the ADAS.

5. The vehicle of claim 3, wherein the degree of involvement of the ADAS increases or decreases a reference for determining the involvement of the ADAS.

6. The vehicle of claim 1, further comprising:
a driving environment detection unit configured to detect a driving environment for the vehicle,
wherein the controller is configured to assign a weight in consideration of the driving environment for the vehicle to the manipulation loads and perform safe driving control corresponding to the manipulation load of the corresponding function from the plurality of functions, the weight is assigned to the manipulation load when the user interface of the plurality of user interfaces is manipulated to use at least one of the plurality of functions of the vehicle.

7. The vehicle of claim 6, wherein the assignment of the weight in consideration of the driving environment comprises increasing the weight in a driving environment that needs relatively more attention of a user, and decreasing the weight in a driving environment that needs relatively less attention of the user.

8. The vehicle of claim 1, wherein the controller is further configured to generate a warning differentiated according to the manipulation load of a selected function when the user interface of the plurality of user interfaces is manipulated to use at least one of the plurality of functions of the vehicle.

9. The vehicle of claim 8, wherein the warning is formed of an alarm sound having a volume corresponding to the size of the manipulation load.

10. The vehicle of claim 8, wherein the warning comprises an announcement comprising information on the size of the manipulation load.

11. A method of controlling a vehicle, comprising:
storing information on sizes of manipulation loads for a plurality of user interfaces to use a plurality of functions of the vehicle; and
performing safe driving control corresponding to a size of a manipulation load of a corresponding function, when a user interface from the plurality of user interfaces is manipulated to use at least the function from the plurality of functions of the vehicle,
wherein the manipulation load comprises a value for the function, the value obtained by estimating an amount of information to be inputted by a user to perform the function,
wherein the manipulation load is updated as a new value in consideration of a frequency and time of manipulating the function by the user.

12. The method of claim 11, wherein the size of the manipulation load for a function from the plurality of functions is determined based on a number of levels from a top level menu to a bottom level menu for the function.

13. The method of claim 11, further comprising activating an ADAS provided to be involved in driving of the vehicle and to assist the driving,
wherein the safe driving control corresponding to the size of the manipulation load comprises controlling a degree of involvement of the ADAS according to the size of the manipulation load.

14. The method of claim 13, wherein the degree of involvement of the ADAS advances or delays a point in time of the involvement of the ADAS.

15. The method of claim 13, wherein the degree of involvement of the ADAS increases or decreases a reference for determining the involvement of the ADAS.

16. The method of claim 11, further comprising:
displaying the plurality of user interfaces; and
displaying icons representing the plurality of functions of the vehicles, respectively, on the display while legibility of the icons is being differentiated according to the sizes of the manipulation loads when displaying the plurality of user interfaces on the display.

17. The method of claim 11, further comprising:
generating a warning differentiated according to the manipulation load of a selected function when the user interface of the plurality of user interfaces is manipulated to use at least one of the plurality of functions of the vehicle.

18. The method of claim 11, further comprising:
detecting a driving environment for the vehicle; and
assigning a weight in consideration of the driving environment for the vehicle to the manipulation load and performing safe driving control corresponding to the manipulation load of the corresponding function from the plurality of functions, the weight is assigned to the manipulation load when the user interface of the plurality of user interfaces is manipulated to use at least one of the plurality of functions of the vehicle.

* * * * *